Figure 1:
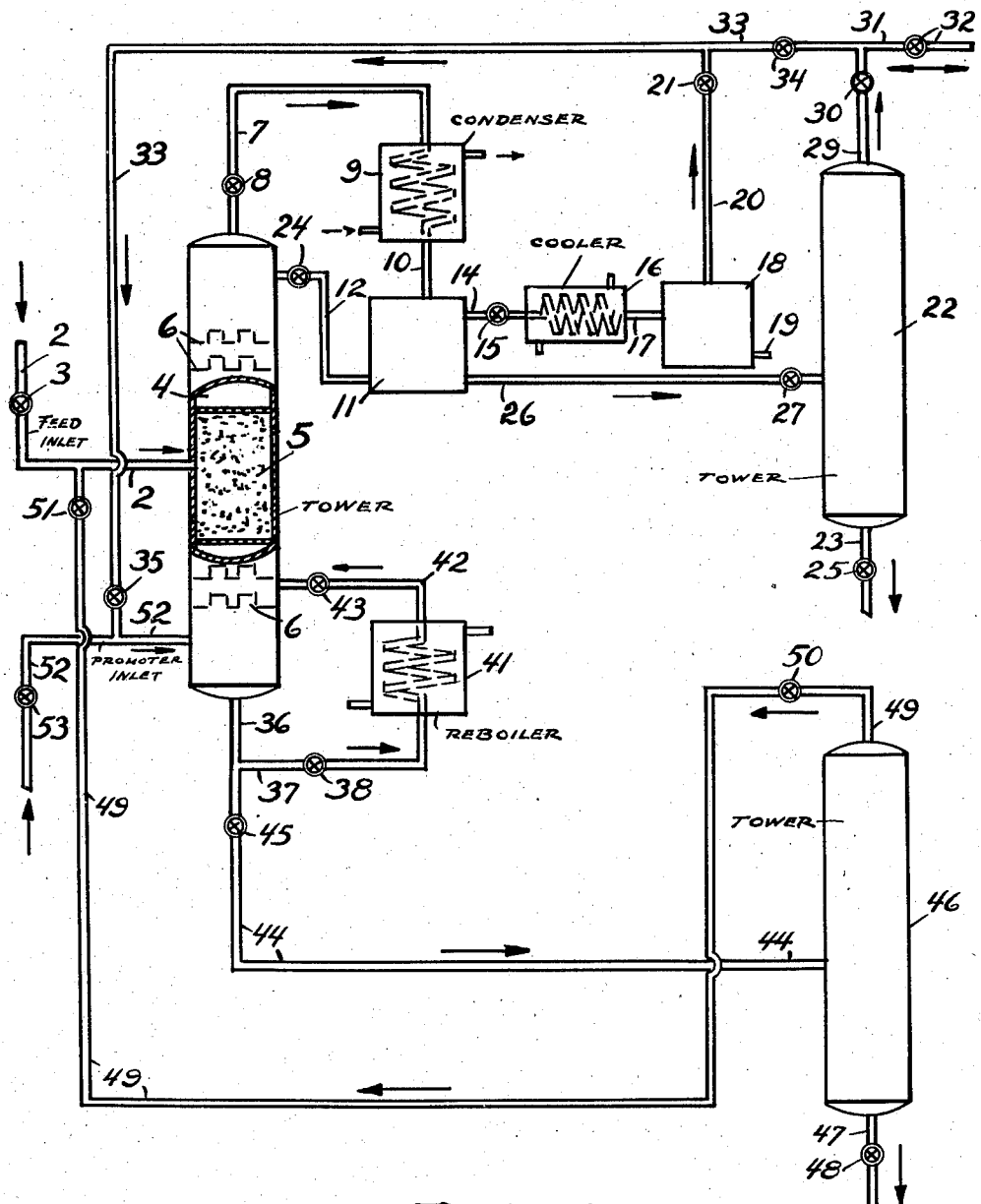

William J. Sweeney Inventor
By P.L. Young Attorney

Patented Oct. 23, 1945

2,387,541

UNITED STATES PATENT OFFICE 2,387,541

PROCESS FOR CARRYING OUT ISOMERIZATION REACTIONS

William J. Sweeney, Summit, N. J., assignor to Standard Oil Development Company, a corporation of Delaware Application January 1, 1942, Serial No. 425,260

21 Claims. (Cl. 260—683.5)

This invention relates to the isomerization of paraffinic hydrocarbons, in particular straight chain or normal paraffins containing at least 4 carbon atoms per molecule to produce the corresponding branched chain or isoparaffins in the presence of Friedel-Crafts type catalyst, in particular the aluminum halides with or without the use of halogen-containing promoters.

The isomerization of normal paraffins of at least 4 carbon atoms per molecule into their corresponding branched chain isomers is already well known. For effecting such reactions it is customary to employ the Friedel-Crafts type catalyst, such as, for example the metal halides, such as zinc chloride, the aluminum halides, such as aluminum chloride, aluminum bromide, and the like in conjunction with promoters such as, for example water, the free halogens, such as chlorine and bromine, the hydrogen halides, such as hydrogen chloride or hydrogen bromide, the lower alkyl halides and poly halides such as, for example methyl, ethyl, propyl or butyl chlorides and bromides, carbon tetrachloride, chloroform and the like. The present invention is concerned with the reaction of normal paraffins of at least 4 carbon atoms to produce the corresponding branched chain isomers in the presence of aluminum halides with or without the use of promotional amounts of the heretofore mentioned halogen-containing compounds. In addition the process may be carried out in the presence of hydrogen which has been found to be advantageous in the suppressing of undesirable side reactions thereby increasing the overall conversion to the desired products by the aluminum halide catalyst employed.

In the carrying out of any paraffinic isomerization reaction, particularly upon a commercial scale in continuous operation, as the reaction progresses and as the catalyst becomes increasingly spent, the catalyst mass has built up thereon degradation products which appear to adversely effect the catalyst action in that the more the degradation products are built up on the catalyst, the greater the tendency seems to be to effect an increase in the rate and the degree of the degradation reaction. It is important, therefore, to suppress as much as possible the tendency of the catalyst to become increasingly spent by reason of having built up thereon these degradation products of the isomerization reaction. It has previously been proposed to simultaneously activate the reaction and distill therefrom the desired product of the reaction. As previously mentioned, however, this has not been found to be totally satisfactory by reason of the fact that the degradation products, especially the higher molecular weight materials, where present on the catalyst, adversely effect the activity of the aluminum chloride or aluminum bromide, thereby causing an increase in the formation of degradation products and decreasing the desirable isomerizing activity of the catalyst.

It is an object of the present invention to isomerize the straight chain paraffins of at least 4 carbon atoms in the presence of aluminum halides with or without promoters and molecular hydrogen in such a manner as to minimize the degradation reaction and thereby increase the overall formation of the desired isomerization product based upon the amount of aluminum halides employed and the amount of normal paraffins charged to the conversion zone.

It is a further object of the invention to carry out such a process in a mixed liquid-vapor phase operation and to remove from close proximity to the catalyst mass the degradation products more or less to the extent in which they are formed and at the rate substantially equal to that at which they are formed while, at the same time, removing the desired products from the catalyst mass in a somewhat analogous manner.

It is a further object of the invention to carry out this isomerization of normal paraffins to isoparaffins in a continuous manner and with a maximum conversion of the feed stock into the highly useful branched chain paraffins.

In order to accomplish the above specified objects as well as others which will be readily apparent upon a fuller understanding of the invention to be more fully hereinafter described, normal butane with or without its usual contaminants, e. g., propane and pentanes, or some other suitable predominantly normal paraffinic feed stock or hydrocarbon mixture predominating in normal paraffin constituents, is continuously fed in liquid phase or in liquid-vapor phase to a fractionating column filled with solid aluminum halide or filled with an aluminum halide impregnated or deposited on a suitable sorbent carrier such as dehydrated bauxite which more or less fills at least the center portion of the fractionating column. The catalyst zone in the fractionating tower-reaction chamber is more or less centrally located with respect to its vertical position in the tower, thereby leaving an appreciable space both above and below the catalyst mass. This space may contain arranged therein a series of trays or bubble cap plates for aiding in fractionation. The catalyst mass may be also bounded at both top and bottom by layers of catalyst carrier material in order to aid in decreasing the degradation of catalyst and feed stock. For convenience, the catalyst mass may be arranged in the catalyst chamber in open mesh removable baskets or trays, facilitating the removal of old catalyst and charging of new catalyst to the reaction zone. The catalyst portion of the fractionating column is maintained at a desired isomerization temperature by adjustment of pressure for the particular feed stock undergoing reaction. The normal paraffin which is unreacted while under the heretofore mentioned conditions builds up in concentration in the catalyst packed portion of the tower while the degradation products and the higher and lower boiling portions of the feed decrease in concentration in the catalyst packed portion. As the desired isomeric product is formed it is vaporized and taken off as overhead from the fractionating column which, as noted, serves both as a reactor and fractionating tower. A substantial portion of the feed stock however is present in the bottom of the fractionating tower and will be found to have remained unreacted. It will also be found to contain in admixture therewith small amounts of heavy degradation products which are formed in the reaction or introduced with the feed. This mixture may be handled in one of two ways or in a combination of two ways; it may be sent to a reboiler and returned to the fractionating-reactor column, or it may be sent to a fractionating tower wherein the unreacted feed is separated from the degradation products and returned to the fractionating column containing the isomerization catalyst. The overhead from the combined isomerization-fractionating column may be cooled and condensed and a portion of the condensate returned to the top of the fractionating-isomerization reactor as reflux condensate and the remainder of the condensate withdrawn from the reflux condensate recycle lines and fractionated. The non-condensed overhead of the reactor after being cooled is largely HCl and/or other chlorine-containing promoter and hydrogen. These are usually recycled to the reaction tower as required. The bottoms from the last named fractionating treatment of course will contain the desired substantially pure isomer.

Not only may the process be operated as heretofore described but a modification thereof may be employed in which the combination isomerization-fractionating tower is operated with a catalyst slurry comprising finely divided catalyst such as aluminum chloride suspended in a suitable medium, for example, the feed stock or reflux condensate recycle, instead of the solid catalyst mass or bed disposed as heretofore mentioned. In such a case the slurry is introduced at or near the top of baffle plates about midway in the combination isomerization-fractionating tower and allowed to flow downwardly therethrough over a series of baffles or other suitable agitation means which provide sufficient agitation to maintain the catalyst in a slurry condition. In operating a slurry process, a filter press or centrifuge is employed in the bottom drawoff and recycle line from the combination isomerization-fractionating tower and that portion of the bottoms passing therethrough is fractionated to remove degradation products therefrom and the overhead of unreacted feed is employed as back-wash for the filter press or centrifuge to form a slurry which is re-introduced into the said tower at or near the top baffle. The bottoms of heavier degradation products coming from the tower are discarded.

The point of introduction of the feed stock into the combination isomerization reactor-fractionating tower when employing the solid catalyst may vary considerably depending on the particular feed stock and reaction conditions employed. Thus, for example, where the catalyst mass has contained thereon considerable amounts of degradation products, the feed stock may be introduced into the fractionating column at or near the top thereof, thereby allowing the liquid to wash the catalyst free of the degradation products which may be adhering thereto. By this procedure, the heavy degradation products which may be present are collected in the bottom of the vessel and thus diluted are more readily conducted to a fractionating column for the separation of the heavy ends from the unreacted feed. If the degree of isomerization, however, is sufficiently rapid so that the initial contacting of the fresh feed with all of the catalyst mass is not required, the feed may be introduced at a point midway in the catalyst zone or even at the bottom. Any other point of introduction in the column is within the contemplation of the present invention. Feeds which contain appreciable amounts of higher boiling materials are generally introduced at or near the bottom of the column; and those containing substantial amounts of lighter materials, at or near the top of the column. As heretofore pointed out, there are distinct advantages to introducing the feed at the various points heretofore mentioned at different stages of catalyst conditions and under varying conditions of catalyst activity and feed composition.

As another modification of the process, a plurality of combination isomerization-fractionating columns or towers may be employed. These are particularly useful where straight run light paraffinic naphthas such as casinghead gasoline or mixtures of $C_5$—$C_6$ straight chain paraffins are employed. In such a case, three still columns are employed which for the sake of clarity will be denoted as columns "A," "B" and "C." In operating a process using, for example, a 50–50 normal $C_5$—$C_6$ paraffinic mixture, columns A and C are of the type heretofore referred to in which the center portion contains aluminum chloride either in solid form or on a carrier, or the columns A and C are of the slurry type heretofore mentioned. Column B, on the other hand, is simply a conventional fractionating tower and is situated between columns A and C. The feed stock entering column A and which comprises substantially a 50–50 mixture of normal $C_5$ and normal $C_6$ paraffins is fractionated in the aluminum chloride bed so as to give a bottoms which is subjected to reboiling or a portion of which is subjected to fractionation containing about 95% of normal $C_5$ and the remainder being $C_7$ and heavier hydrocarbons which constitute degradation products in the reaction. These are permanently removed from the system by withdrawing them from the reboiler recycle line and refractionating the same, allowing the overhead to constitute substantially only normal $C_6$ hydrocarbons which are returned to the feed line to column A and reintroduced into the catalyst zone, the heavier degradation products removed from the second fractionating tower being withdrawn permanently from the system. The column A tower is operated so that the composition at the top of the catalyst bed is roughly 20% $C_5$ paraffins, 40% n-$C_5$ paraffins and 40% iso-$C_5$ paraffins, and the reflux recycle line contains a paraffinic hydrocarbon mixture roughly the composition of which is 10% $C_5$ paraffins, 5% n-$C_5$ paraffins and 85% iso-$C_5$ paraffins. While the major portion of this reflux condensate is returned to column A, a portion of it is withdrawn and enters column B. The overhead from column A which is not condensed but which remains in vapor form is chiefly n-$C_5$ together with some iso-$C_5$ paraffins, and this may be either returned together with the hydrogen chloride and/or hydrogen present to the feed line to column A, or it may be combined with the overhead from fractionating column B and introduced as feed into the combination tower column C. The withdrawn portion from the reflux condensate recycle line to column A is introduced as feed into column B and the iso-$C_5$ paraffin is withdrawn as a bottoms from this column, a side stream is withdrawn as n-$C_5$ paraffin and returned to the said line to column A, and the overhead is joined with the overhead vapors from column A and goes to column C as the feed stock. Column C is operated so that the bottoms thereof, a portion of which are withdrawn in the manner heretofore described with reference to column A, give about a 95% n-$C_5$ and 5% $C_6$ and heavier hydrocarbon composition in the reboiler. In a separate fractionator the $C_6$ and heavier are withdrawn as bottoms and returned to the feed line to column A, the overhead from this fractionator being returned to the feed line to column C. The composition at or near the top of the catalyst bed in column C is roughly 50% of isopentane and 50% of normal pentane with some small amounts of $C_4$ paraffins being also present. The overhead from column C is condensed and forms reflux recycle mixture, the vapors or the uncondensed portion therefrom constituting hydrogen chloride and/or hydrogen together with traces of $C_3$ and $C_4$ paraffins. If these traces of $C_3$ and $C_4$ paraffins become troublesome, causing excessive dilution of the recycle stream connecting with the feed line to column C, they may be separately fractionated in order to remove a substantial portion of the $C_3$ and $C_4$ paraffins, which are withdrawn from the system. A portion of the recycle reflux condensate is withdrawn and subjected to a separate fractionation in a tower heretofore not designated in which the desired isopentane is separated from the normal pentane, which is recycled to the feed line to column C.

It is also within the contemplation of the present invention to not only conduct a plurality of separate isomerization reactions where mixed feeds are employed but to also conduct a plurality of reactors where a single feed stock is employed, that is, a feed stock predominating or composed essentially of a single normal paraffin, say, for example, normal butane. The plurality of combination fractionating-isomerization towers in such an instance may also be operated in either series or parallel. Preferably in commercial operations parallel operation is desired in order to facilitate the placing on-stream and taking off-stream of reactors as the catalyst masses become degraded and inactive with continued use. These catalyst masses may be either removed and replaced by fresh catalyst mass or they may be reactivated in conventional manner followed by reimpregnation with aluminum chloride in a suitable manner. If series operation is preferred, and this is ofttimes desirable where high throughput rates are employed, the normal $C_5$ may be subjected to simultaneous fractionation and isomerization in column 1 and the overhead which is withdrawn permanently from the reflux condensate recycle line serves as a feed stock to a similar column to that of column 1 which is designated herein as column 2 in which further reaction may be had and a portion taken from the reflux condensate line of column 2 may in turn serve as a feed stock for a similar column 3, and so on until the desired number of columns are employed which give the desired degree of isomerization. If found desirable, and ofttimes it will be, the arrangement of combination fractionating-isomerization towers in series is best adapted for use in conjunction with straight conventional fractionating towers placed between each of the fractionating-isomerization towers so that the feed stock for a succeeding tower and which is withdrawn from a preceding reflux condensate recycle line, is subjected to fractionation to remove substantial amounts of products from the preceding reaction with the principal part of the unreacted portion of the feed being used as feed stock for the subsequent fractionating-isomerization tower. In such a case the overhead may be collected from a number of such fractionators and the normally gaseous portion thereof fed back to the same or a different isomerization reaction zone in order to afford sufficient supplies of hydrogen chloride and/or hydrogen to serve as promoters in the isomerization reaction zones. In any event, the heavier degradation products are removed from the combination fractionation-isomerization tower as bottoms by withdrawing a portion of the bottoms from the reboiler lines and separately fractionating the same, returning the overhead to the same or a different isomerization reaction zone and permanently removing the $C_5$ and heavier degradation products from these bottoms coming from the bottoms reboiler fractionation.

Various feed stocks may be employed in the practicing of the present invention such as, for example, normal butane, normal pentane, normal hexane, normal heptane, and the higher homologues, or such feeds as field butanes, casinghead gasoline and the like may be used. Mixtures of two or more of the above-mentioned single hydrocarbons may also be employed as well as mixtures which may contain substantial amounts of isoparaffins in addition to normal paraffins. When employing straight run light naphthas as the feed stock in the reaction it is also desirable to employ molecular hydrogen in connection with the aluminum chloride catalyst in order to suppress in so far as possible the cracking tendency. Hydrogen may also be employed advantageously with the lighter hydrocarbons.

The isomerization reaction conditions in the presence of aluminum halides and in the presence of suitable promoters are more or less well known. However, particularly for the isomerization of normal butane, generally a temperature between about 75° F. and about 350° F. is employed with a catalyst concentration of between about 10% and about 200% by weight of the normal butane present in the reactor at any one time. The hydrogen halide promoter may be added or recycled at hourly rates equivalent to between about 1 and about 20% by weight of the normal butane present in the reactor at any one time, and the average contact time of the normal butane may vary from about 0.5 hour to about 25 hours. In the case of normal pentane isomerization, the temperature is ordinarily maintained between about 40 and 125° F. with a promoter concentration, for example hydrogen halide, between about 1% and about 22% by weight, a contact time of between about ½ hour and about 9½ hours and a catalyst concentration about the same as with normal butane. Likewise, when employing straight run naphthas or field butanes, the reaction conditions are varied accordingly. In general the higher the number of carbon atoms per mole in the materials present in the feed stock, the milder the isomerization conditions employed, and if need be vacuum or gas dilution can be resorted to for effecting distillation. For any of the above stated reaction conditions, however, where ranges are presented, it is necessary to correlate any one reaction condition with the others in order to obtain maximum results so far as isomerization products are concerned. Where increased amounts of hydrogen chloride are employed, shorter contact times are customarily used.

The accompanying drawings represent in more or less diagrammatic form and partial sectional elevation representations of flow plans of the equipment which may be employed for carrying out the process of the present invention.

Figure 2:
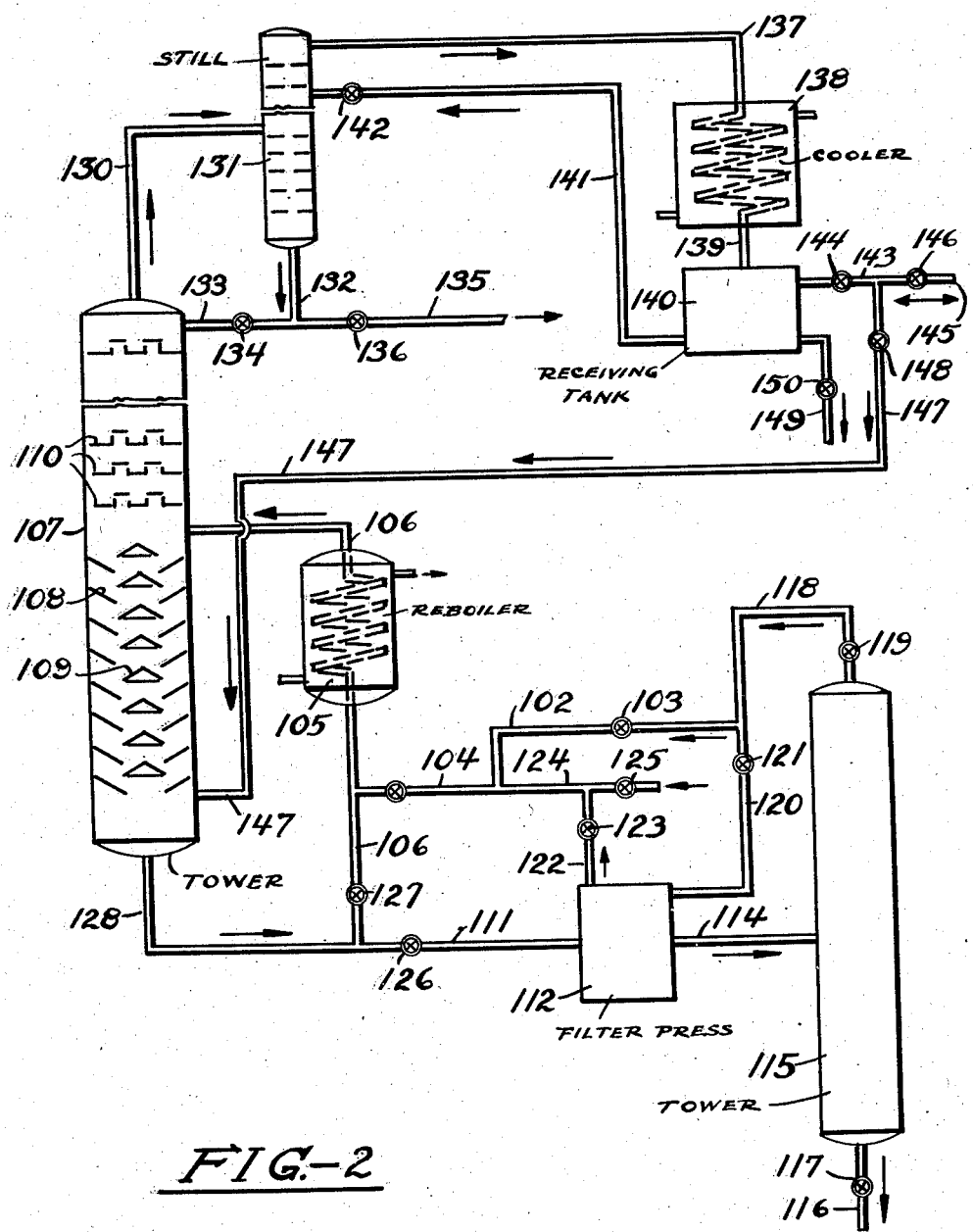

Figure 1 discloses a flow plan of a suitable apparatus for carrying out the preferred method of operation wherein a bed type catalyst mass is employed. Figure 2 discloses and represents a suitable apparatus and flow plan wherein a slurry type of catalyst is contacted under isomerization reaction conditions. Figure 2, likewise, represents an apparatus suitable for the use of aluminum bromide or other suitable liquid Friedel-Crafts type catalyst for use in carrying out the process of the present invention.

With reference to Figure 1, the feed stock employed may be, for example, normal butane or normal pentane. For the purposes of the present illustration, however, it will be described as normal butane. This is introduced through feed line 2, controlled by valve 3, into the combination fractionating-isomerization tower 4 which has a center section having arranged and disposed therein baskets or trays containing the catalyst mass and above and below this catalyst mass 5 are the usual plates or fractionating column packing such as Raschig rings which are diagrammatically and representatively referred to in the drawings as plate 6.

The solid catalyst mass which is, for example, aluminum chloride adsorbed, disposed or impregnated on highly porous material such as activated carbon, diatomaceous earth, acid-treated clay such as Super Filtrol, montmorillonite, bauxite, dehydrated bauxite, Porocel, Silocel, silica gel, alumina gel, activated alumina and the like, is placed in the center section 5 of tower 4. The aluminum chloride may be deposited on these porous substances either prior to their introduction into the fractionating column or vapors of aluminum chloride may be admixed with the feed stock and the impregnation may take place in situ. In general, the aluminum chloride is present in the adsorbent in amounts between about 1% and about 25%, preferably between about 8% and about 12%, and it is desirable generally to add no more aluminum chloride to the porous carrier than will be tenaciously held therein so that the overhead from the reaction zone is substantialy free of aluminum chloride vapors under the reaction and fractionating conditions obtaining. Substantially anhydrous hydrogen chloride is introduced into column 4 by means of line 52, controlled by valve 53, and the hydrogen chloride is allowed to pass upwardly through the catalyst bed and up through line 7, controlled by valve 8, as overhead from the tower. The fractionating column may be maintained generally under a hydrogen chloride pressure of roughly 100 lbs./sq. in. or corresponding to between about 3% and about 18%, preferably between about 6% and about 10%, of hydrogen chloride based on the feed stock. The fractionating column is maintained at a temperature of roughly between about 75° F. and about 350° F. and the pressure on the column is regulated to give the desired degree of fractionation and separation of product from unreacted paraffin. The normal paraffin which is isomerized tends by reason of the refluxing to work its way toward the top of the column so that the contents of the overhead from column 4 passing through line 7, controlled by valve 8, and through cooler 9 comprise substantially only isoparaffin, for example isopentane if normal pentane is the feed stock, together with quite small amounts of normal pentane, any small quantities of degradation products such as the butanes or propanes being likewise carried overhead. The material entering receiver 11 through line 10 has been condensed and a portion of the liquid is returned to the top of column 4 through line 12, controlled by valve 24, to serve as recycle reflux condensate, while the remaining portion of the liquid is withdrawn through line 26, controlled by valve 27, to fractionating column 22 wherein substantially pure isopentane is withdrawn from the bottom of the tower through line 23, controlled by valve 25. The overhead which consists of any traces of promoter and degradation products as well as other lighter products than isopentane is removed through line 29, controlled by valve 30, and may either be discarded through line 31, controlled by valve 32, or returned to the system through line 33, controlled by valves 34 and 35. The non-condensed portion of the reacted mixture entering receiver 11 is withdrawn as vapor through line 14, controlled by valve 15, and passed through a low temperature cooler 16 which is designed to reduce the temperature to a point where substantial amounts of butane and/or propane are liquefied. The cooled mixture is then passed by means of line 17 to receiver 18 and the liquid condensate is withdrawn from the system through line 19 while the hydrogen chloride and/or hydrogen, if it is present, are passed through line 20, controlled by valve 21. If considerable amounts of methane or ethane are eventually, after long continued usage, built up in the system, valve 35 may be closed and valves 32 and 34 opened and the ethane bled from the system in this manner. Generally speaking, however, this is unnecessary and valve 35 is opened, allowing for the hydrogen chloride or other promoters present, together with small amounts of propane and/or butane, to be returned to the isomerization unit in column 4 by means of line 33.

In order to maintain sufficient heat for distillation, the liquid hydrocarbons which collect in the bottom of tower 4 are withdrawn through line 36 and at least partially passed through a reboiler 41 and back to the tower 4 by means of lines 37 and 42, controlled by valves 38 and 43. In operating the system, however, not all of the withdrawn portion of the bottoms is passed through reboiler 41 but a portion thereof is continuously diverted through line 44, controlled by valve 45, and passes to fractionating tower 46 where a separation is made between the $C_6$ and heavier hydrocarbons which represent degradation products of the reaction and the unreacted normal pentane which represents the feed stock which is passed overhead through line 49, controlled by valves 50 and 51, and returned to feed line 2 for further treatment in the fractionating-isomerization column 4. The bottoms which constitute the degradation products are withdrawn through line 47, controlled by valve 48.

The operation of the process as carried out in Figure 2, which represents a diagrammatic sectional elevation of a slurry type process, will be described using normal pentane as the feed stock and using a temperature of about 90° F. and a hydrogen chloride pressure with or without elemental or free hydrogen sufficient to maintain the combination fractionating-isomerization tower under suitable distillation and reflux conditions. The normal pentane is introduced into the system through line 124, controlled by valve 125, and from there flows through lines 124, 104 and 106 through reboiler 105 into the combination isomerization-fractionating tower 107 equipped with a series of plates 108 and baffles 109 in the lower portion of the tower and a sufficient number of distillation plates 110 in the upper portion of the tower to effectively separate isomer from unreacted portions of the feed stock. The finely divided aluminum chloride or finely divided aluminum chloride impregnated on sorbed on a highly porous carrier as heretofore described is suspended in the medium of normal pentane either just prior to the introduction of the fresh feed through line 124 into the system or the fresh feed minus any additional catalyst contacts the slurry recycle path represented by lines 128, 106 and the lower portion of tower 107, the slurry being permitted to follow this path by means of a pump or other suitable force (not shown). The rate of flow of the slurry through this path of operation is controlled by valve 127. Hydrogen chloride and/or elemental or molecular hydrogen or other suitable promoter is introduced into the system through line 145, controlled by valve 146, and by means of line 147, controlled by valve 148, enters the combination tower 107 at or near its bottom and is permitted to flow upwardly through the slurry under the isomerization conditions obtaining. The temperature and pressure conditions under which the slurry is maintained in tower 107 are correlated so that the isomer, in this particular instance isopentane, is carried overhead through line 130 to a tower 131 wherein a separation is effected between isopentane, which is withdrawn as bottoms through line 132, and $C_4$ and lighter hydrocarbon together with the promoter, for example hydrogen chloride, being withdrawn as overhead through line 137, cooled in condenser 138, withdrawn into receiver 140 by means of line 139, and at least a portion thereof being returned as reflux condensate at or near the top of tower 131 by means of line 141, controlled by valve 142. In turn the bottoms, namely isopentane, coming from tower 131 through line 132 may in part at least be returned to the tower 107 through line 133, controlled by valve 134, so that reflux condensate is furnished to tower 107 as well. The desired product is withdrawn from the system through line 135, controlled by valve 136. The overhead product from tower 131 comprising the principal amounts of the promoter and/or hydrogen, if it is present, is withdrawn through line 143, controlled by valve 144, and either withdrawn from the system through line 145, controlled by valve 146, or recycled to reactor tower 107 by closing valve 146 and opening valve 148, thereby permitting the hydrogen chloride to return through line 147 to tower 107. The small amounts of $C_4$ and lighter degradation products collecting in receiver 140 may from time to time as desired be withdrawn permanently from the system through line 149, controlled by valve 150.

A portion of the bottoms withdrawn from tower 107 and constituting the slurry passing through reboiler 105 by means of lines 128 and 106 may, by properly adjusting the openings of valves 126 and 127, be permanently withdrawn from the slurry recycle and passed by means of line 111 to centrifuge or filter press 112 wherein the solid catalyst mass is withdrawn and the solid-free bottoms from tower 107 are passed by means of line 114 into fractionating tower 115 operated so as to effect a separation between the $C_6$ and heavier hydrocarbons which are withdrawn as bottoms through line 116, controlled by valve 117, and an overhead consisting largely of normal pentane which has as yet not reacted in tower 107. The overhead is withdrawn through line 118, controlled by valve 119, condensed in a cooler (not shown) and part of the condensate may be returned to tower 115 (by a line not shown) to serve as a reflux condensate. Part or all of the normal pentane, valve 103 being closed, is employed as a back-wash for the filter press or centrifuge 112, permitting the picking up and formation of a slurry of the aluminum chloride with the normal pentane, which in turn is admixed with the fresh feed entering the system through line 124 by conducting the slurry through line 122, controlled by valve 123, and from thence through line 124 into the reboiler 105 recycle system represented by lines 106 and 128 and the lower portion of reactor 107. If desired, all or a portion of the overhead from tower 115 consisting essentially of normal pentane may by-pass the filter or centrifuge 112 by completely or partially closing valve 121 and partially or completely opening valve 103 and permitting the overhead from tower 115 to flow through lines 118 and 102 into feed line 124 and from there into the tower 107 as before described.

The slurry of aluminum chloride and normal pentane normally contains between about 20% and about 50% of aluminum chloride catalyst mass and the aluminum chloride present in the catalyst carrier may range from about 1% to about 25% as heretofore indicated, but preferably it is maintained between about 5% and about 15%.

Likewise, as previously mentioned, a solution of aluminum bromide may conveniently be employed in place of solid aluminum chloride slurry, in which case substantially the same apparatus as described with slight modifications to accommodate liquid catalyst instead of solid catalyst may be employed.

Having thus fully described and illustrated the specific manner in which the process may be operated, the following examples are given to indicate data secured from runs carried out in accordance with the process of the present invention but it is intended that the invention be not limited thereto.

Example 1

A catalyst was prepared by impregnating aluminum chloride on a base of porous alumina so that the final catalyst composition contained about 17% aluminum chloride. A fractionating tower was charged with about 20.8 grams of this catalyst with conventional tower packing placed on both sides of the catalyst mass and was then contacted with about 310 grams of normal pentane at a temperature of about 90° F. while slowly bubbling hydrogen chloride through the tower. At the end of about 6¾ hours of contact the reacting mixture was found to have distilled over about 7% of isopentane, based on n-pentane charged, which represented a selectivity of about 70% and a yield of about 0.92 gallon of isopentane per pound of aluminum chloride employed.

Under similar operating conditions except that the catalyst was aluminum chloride directly suspended in a turbo mixer type of operation the yield represented about 0.4 gallon of isopentane per pound of aluminum chloride.

Example 2

In a similar run such as that described in Example 1 and wherein 27 grams of the same catalyst was employed and wherein normal pentane was reacted under substantially the same conditions, about 11% of the normal pentane treated was found to have reacted with about 64% selectivity giving a yield of about 0.84 gallon of isopentane per pound of aluminum chloride employed.

The following table indicates the analytical data obtained from runs described in Examples 1 and 2 as to the product overhead fraction and bottoms from each run.

|  | Example 1 | Example 2 |
|---|---|---|
| Percent overhead (paraffins) | 19 | 38.4 |
| Percent $C_4$ | 7.0 | 4.0 |
| Percent Iso-$C_5$ | 31 | 17.0 |
| Percent n-$C_5$ | 62 | 79.0 |
| Percent $C_6+$ | 0 | 0 |
| Percent bottoms (paraffins) | 81 | 61.6 |
| Percent $C_4$ | 0 | 0 |
| Percent Iso-$C_5$ | 0 | 0 |
| Percent n-$C_5$ | 97.5 | 97.0 |
| Percent $C_6+$ | 2.5 | 3.0 |

Having thus fully described and illustrated the character and nature of the invention, what is desired to be secured by Letters Patent is:

1. A process which comprises contacting a normal paraffin containing at least four carbon atoms per molecule with an aluminum halide catalyst mass arranged in the form of a bed of solid catalyst under conditions of temperature and pressure such as to effect a simultaneous isomerization and distillation of isomerized products from the catalyst bed under the isomerization conditions obtained, while separately and independently removing both high boiling and low boiling degradation products from the catalyst mass substantially as formed and supplying heat for distillation and isomerization to reactants condensing and flowing from the catalyst mass by reheating at least a portion of the high boiling products at a point removed from the catalyst mass and recycling said reheated portion.

2. A process which comprises passing a mixture of normal pentane and hydrogen chloride through a fractionating zone containing a reaction zone provided with a bed of a solid catalyst mass comprising essentially aluminum chloride under combined conditions of isomerization and fractionation, subjecting the normal pentane to isomerization and fractionating the reaction products into lighter and heavier fractions within said fractionation zone, recovering isopentane as overhead from said fractionation zone while separately and independently removing heavier degradation products of the reaction from the bottoms coming from said fractionation zone substantially as formed and reheating and recycling at least a portion of said bottoms to the fractionation zone.

3. A process as in claim 2 wherein the heavier products of the reaction together with unreacted normal pentane are removed from the bottom of the fractionation zone, reheated to a sufficient temperature to maintain distillation and refluxing, and return to the fractionation zone.

4. A process as in claim 2 wherein at least a portion of said bottoms is withdrawn, subjected to a fractionation to separate as overhead n-pentane and as bottoms the heavy degradation products and returning the normal pentane to the original fractionation zone.

5. A process as in claim 2 wherein molecular hydrogen is employed to suppress cracking.

6. A process as in claim 2 wherein the feed stock employed is introduced near the top of the catalyst zone and permitted to percolate through the catalyst bed.

7. A process which comprises passing normal butane at a temperature of about 200° F. and a pressure of about 240 lbs. per square inch through a solid bed of aluminum chloride deposited upon a sorptive carrier and in the presence of hydrogen chloride, said bed of aluminum chloride being maintained under combined isomerization-fractionation conditions for the normal butane and its isomerization products, subjecting the normal butane to isomerization and fractionating the reaction products into lighter and heavier fractions in the catalyst zone, while separately and independently removing both high boiling and low boiling degradation products from the catalyst zone substantially as formed and reheating and recycling at least a portion of high boiling products to the catalyst zone.

8. A process which comprises contacting straight run naphtha with a solid bed of aluminum chloride deposited on a sorptive carrier in a combination fractionating-isomerization tower while in the presence of a hydrogen halide and molecular hydrogen maintained under a correlation of temperature and pressure such that isomerization takes place together with a simultaneous fractionation to remove isomeric products from the reaction as overhead while separately and independently removing both high boiling and low boiling degradation products from the catalyst zone substantially as formed and reheating and recycling at least a portion of high boiling products to the catalyst zone.

9. A process as in claim 8 wherein the bottoms of the combination fractionating-isomerization tower are subjected to reboiling and wherein at least a portion of the bottoms prior to their return to the combined isomerization-fractionating tower are subjected to fractionating for the removal of heavier degradation products of the reaction.

10. A continuous process for the isomerization of normal pentane to isopentane which comprises filling a substantial portion of a fractionating tower with a catalyst bed comprising essentially aluminum chloride impregnated on a sorptive carrier, maintaining a temperature of about 90° F. in the tower, feeding to the said catalyst bed normal pentane and hydrogen chloride under pressures sufficient to liquefy substantial amounts of n-pentane, yet insufficient to liquefy substantial amounts of isopentane, withdrawing the bottoms, reboiling the same, reintroducing said reboiled bottoms into said tower to maintain the catalyst bed at an average temperature of about 90° F., and removing isopentane from the overhead of the system as reflux condensate while removing $C_6$ and heavier hydrocarbons from the bottoms substantially as formed.

11. A process as in claim 10 wherein at least a portion of the removed bottoms have heavy degradation products removed therefrom and at least a portion of the overhead have lighter degradation products removed therefrom prior to their reintroduction into the combination fractionator and reactor.

12. A process as in claim 10 wherein at least a portion of the removed bottoms have the heavy degradation products removed therefrom prior to their reintroduction into the combination fractionator and reactor, wherein molecular hydrogen is employed, wherein the overhead condensate is separately fractionated to separate isopentane from hydrogen and hydrogen chloride, and wherein the hydrogen and hydrogen chloride are returned to the combination fractionator and reaction zone for contact with the unreacted normal pentane.

13. A process which comprises passing a mixture of normal butane and hydrogen chloride through a fractionating zone containing a catalyst bed comprising essentially aluminum chloride under combined conditions of isomerization and fractionation, subjecting the normal butane to isomerization and fractionating the reaction products into lighter and heavier fractions within said fractionation zone, recovering isobutane as overhead from said fractionation while separately and independently removing heavier degradation products of the reaction from the bottoms coming from said fractionation zone substantially as formed and reheating and recycling at least a portion of said bottoms to the fractionation zone.

14. A process of isomerizing at least one normal paraffin containing at least four carbon atoms per molecule under isomerization reaction conditions with an aluminum halide and a halogen-containing promoter which comprises maintaining a solid bed of aluminum halide catalyst particles intermediate the upper and lower portions of a fractionating zone, passing vapors of promoter and normal paraffin feed stock through the said catalyst bed while maintaining fractionation-isomerization conditions, subjecting the normal paraffin to isomerization and fractionating the reaction products into lighter and heavier fractions within said fractionation zone, removing as overhead the isoparaffin product of the reaction together with lighter degradation products of the reaction, removing bottoms containing heavier fractions from the fractionation zone, and reheating and recycling at least a portion of the bottoms to the fractionation zone.

15. A process as in claim 14 wherein the catalyst is aluminum chloride deposited on a porous alumina carrier and the promoter is hydrogen chloride.

16. A process as in claim 14 wherein the catalyst is aluminum chloride deposited on a porous alumina carrier and the promoter is hydrogen chloride and wherein the overhead vapors are withdrawn from the fractionation zone and condensed, at least a portion of the bottoms is withdrawn from the fractionating zone and the two liquids separately and independently fractionated to segregate the lighter and heavier degradation products of the isomerization reaction, returning to the bottom of the fractionating tower the unreacted normal paraffin and recovering the isoparaffin product of the reaction from the fractionated condensed overhead.

17. A process as in claim 14 wherein the catalyst is aluminum chloride deposited on a porous alumina carrier, the promoter is hydrogen chloride and the feed stock is predominantly normal pentane.

18. A process as in claim 14 wherein the catalyst is aluminum chloride deposited on a porous alumina carrier, the promoter is hydrogen chloride and the feed stock is predominantly normal butane.

19. A process of isomerizing normal paraffin of at least four carbon atoms per molecule to the corresponding isoparaffin under isomerization reaction condtions in the presence of aluminum chloride and hydrogen chloride which comprises maintaining a fractionating zone, passing through said fractionating zone normal paraffin under combined isomerization-fractionation conditions to produce isoparaffin and lighter and heavier degradation products, withdrawing isoparaffin product of the reaction as overhead therefrom while maintaining a bed of aluminum chloride catalyst particles within the fractionating zone, withdrawing from the bottom of the fractionation zone liquids from which separately and independently the heavier degradation products of the reaction are segregated and removed from the system, and recovering isoparaffin from the condenser overhead vapors while discarding the lighter degradation products of the reaction from the system.

20. A process as in claim 19 wherein normal pentane is the feed stock.

21. A process as in claim 19 wherein normal butane is the feed stock.

WILLIAM J. SWEENEY.